US012759360B2

(12) United States Patent
Tanabe et al.

(10) Patent No.: US 12,759,360 B2
(45) Date of Patent: Oct. 13, 2026

(54) VEHICLE CONTROL APPARATUS, VEHICLE CONTROL METHOD, AND VEHICLE CONTROL SYSTEM

(71) Applicant: Hitachi Astemo, Ltd., Hitachinaka (JP)

(72) Inventors: Yasuyuki Tanabe, Hitachinaka (JP); Yuichiro Minakuchi, Hitachinaka (JP); Yoshinori Kono, Hitachinaka (JP); Kyoichi Tagami, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 216 days.

(21) Appl. No.: 18/708,668

(22) PCT Filed: Nov. 29, 2022

(86) PCT No.: PCT/JP2022/043938

§ 371 (c)(1),
(2) Date: Nov. 22, 2024

(87) PCT Pub. No.: WO2023/106165

PCT Pub. Date: Jun. 15, 2023

(65) Prior Publication Data

US 2025/0187386 A1 Jun. 12, 2025

(30) Foreign Application Priority Data

Dec. 9, 2021 (JP) ................................. 2021-200259

(51) Int. Cl.
*B60G 17/015* (2006.01)

(52) U.S. Cl.
CPC .... *B60G 17/015* (2013.01); *B60G 2400/0511* (2013.01); *B60G 2400/0512* (2013.01);
(Continued)

(58) Field of Classification Search
CPC .. B60G 17/015; B60G 17/016; B60G 17/018; B60G 2400/0511; B60G 2400/0512;
(Continued)

(56) References Cited

U.S. PATENT DOCUMENTS

| | | | | |
|---|---|---|---|---|
| 10,328,827 B2 * | 6/2019 | Knox | ........................ | B60N 2/39 |
| 2017/0129367 A1 | 5/2017 | Hein | | |

(Continued)

FOREIGN PATENT DOCUMENTS

| | | |
|---|---|---|
| JP | 2018-537363 A | 12/2018 |
| JP | 2020-59477 A | 4/2020 |

OTHER PUBLICATIONS

International Search Report (PCT/ISA/210) issued in PCT Application No. PCT/JP2022/043938 dated Jan. 24, 2023 with English translation (5 pages).

(Continued)

*Primary Examiner* — Hai H Huynh
(74) *Attorney, Agent, or Firm* — Crowell & Moring LLP

(57) ABSTRACT

In one aspect of a vehicle control apparatus, a vehicle control method, and a vehicle control system according to the present invention, a control unit acquires occupant specifications including a mass of an occupant in a vehicle and position of center of gravity of the occupant, acquires a physical quantity about an attitude angle of the vehicle, the attitude angle including at least one of a roll angle and a pitch angle of the vehicle, acquires a physical quantity about an acceleration of the vehicle, and outputs a control command for activating an actuator unit that controls an attitude of the vehicle based on a physical quantity about a moment applied to the occupant, with the moment being calculated based on the occupant specifications, the physical quantity about the attitude angle, and the physical quantity about the acceleration, and the moment including at least one of an (Continued)

occupant roll moment and an occupant pitch moment applied to the occupant by a force that the occupant receives from a behavior of the vehicle. In this way, comfort for the occupant in the vehicle can be improved.

3 Claims, 14 Drawing Sheets

(52) U.S. Cl.
CPC .... *B60G 2400/10* (2013.01); *B60G 2400/252* (2013.01); *B60G 2800/01* (2013.01)

(58) Field of Classification Search
CPC .......... B60G 2400/10; B60G 2400/252; B60G 2400/104; B60G 2400/62; B60G 2800/01; B60G 2800/012; B60G 2800/014; B60G 2800/9123; B60G 2600/182; B60R 21/015
USPC ...................................................... 701/37–40
See application file for complete search history.

(56) References Cited

U.S. PATENT DOCUMENTS

| | | | |
|---|---|---|---|
| 2020/0114721 | A1 | 4/2020 | Tanzan et al. |
| 2022/0048353 | A1 | 2/2022 | Tanzan et al. |
| 2022/0097472 | A1 | 3/2022 | Tanzan et al. |
| 2023/0116140 | A1 | 4/2023 | Tanzan et al. |

OTHER PUBLICATIONS

Japanese-language Written Opinion (PCT/ISA/237) issued in PCT Application No. PCT/JP2022/043938 dated Jan. 24, 2023 with English translation (7 pages).
International Preliminary Report on Patentability (PCT/IB/338 & PCT/IB/373) issued in PCT Application No. PCT/JP2022/043938 dated Jun. 20, 2024, including Japanese-language Written Opinion (PCT/ISA/237) with English translation (11 pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, to a vehicle control method, and to a vehicle control system.

BACKGROUND ART

Patent Document 1 discloses a roll vibration-damping control apparatus for a vehicle. This apparatus calculates, as a control roll moment (Mxc), a sum of the product of a roll angle acceleration ($\varphi s^2$) detected by a roll angle acceleration sensor and a roll inertia moment, the product of a first-order integral value ($\varphi s$) of the roll angle acceleration and a roll damping coefficient, and the product of a second-order integral value ($\varphi$) of the roll angle acceleration and an equivalent roll stiffness. The roll vibration-damping control apparatus also calculates, as a correction roll moment (Mxa), a roll moment around the sprung gravity center, the roll moment being generated by the lateral force applied to the road wheels of the vehicle at a roll motion. The roll vibration-damping control apparatus corrects the control roll moment with the correction roll moment, calculates a target roll moment by multiplying the corrected control roll moment by a control gain, and controls an actuator based on the calculated target roll moment.

REFERENCE DOCUMENT LIST

Patent Document

Patent Document 1: JP2020-059477 A

SUMMARY OF THE INVENTION

Problem to be Solved by the Invention

Even if the roll vibration of the vehicle can be damped by executing the roll vibration-damping control, an occupant in the vehicle is affected not only by the roll vibration, but also the lateral acceleration and longitudinal acceleration of the vehicle. Therefore, comfort for the occupant may not be improved.

The present invention has been made in view of actual circumstances, and it is an object of the present invention to provide a vehicle control apparatus, a vehicle control method, and a vehicle control system that can improve comfort for an occupant in a vehicle.

Means for Solving the Problem

According to the present invention, in one aspect thereof, a control unit acquires occupant specifications including a mass of an occupant in a vehicle and position of center of gravity of the occupant, acquires a physical quantity about an attitude angle of the vehicle, the attitude angle including at least one of a roll angle and a pitch angle of the vehicle, acquires a physical quantity about an acceleration of the vehicle, and outputs a control command for activating an actuator unit that controls an attitude of the vehicle based on a physical quantity about a moment applied to the occupant, with the moment being calculated based on the occupant specifications, the physical quantity about the attitude angle, and the physical quantity about the acceleration, and the moment including at least one of an occupant roll moment and an occupant pitch moment applied to the occupant by a force that the occupant receives from a behavior of the vehicle.

Effects of the Invention

According to the present invention, comfort for an occupant in a vehicle can be improved.

MODE FOR CARRYING OUT THE INVENTION

Hereinafter, embodiments of a vehicle control apparatus, a vehicle control method, and a vehicle control system according to the present invention will be described with reference to the drawings.

Figure 1:
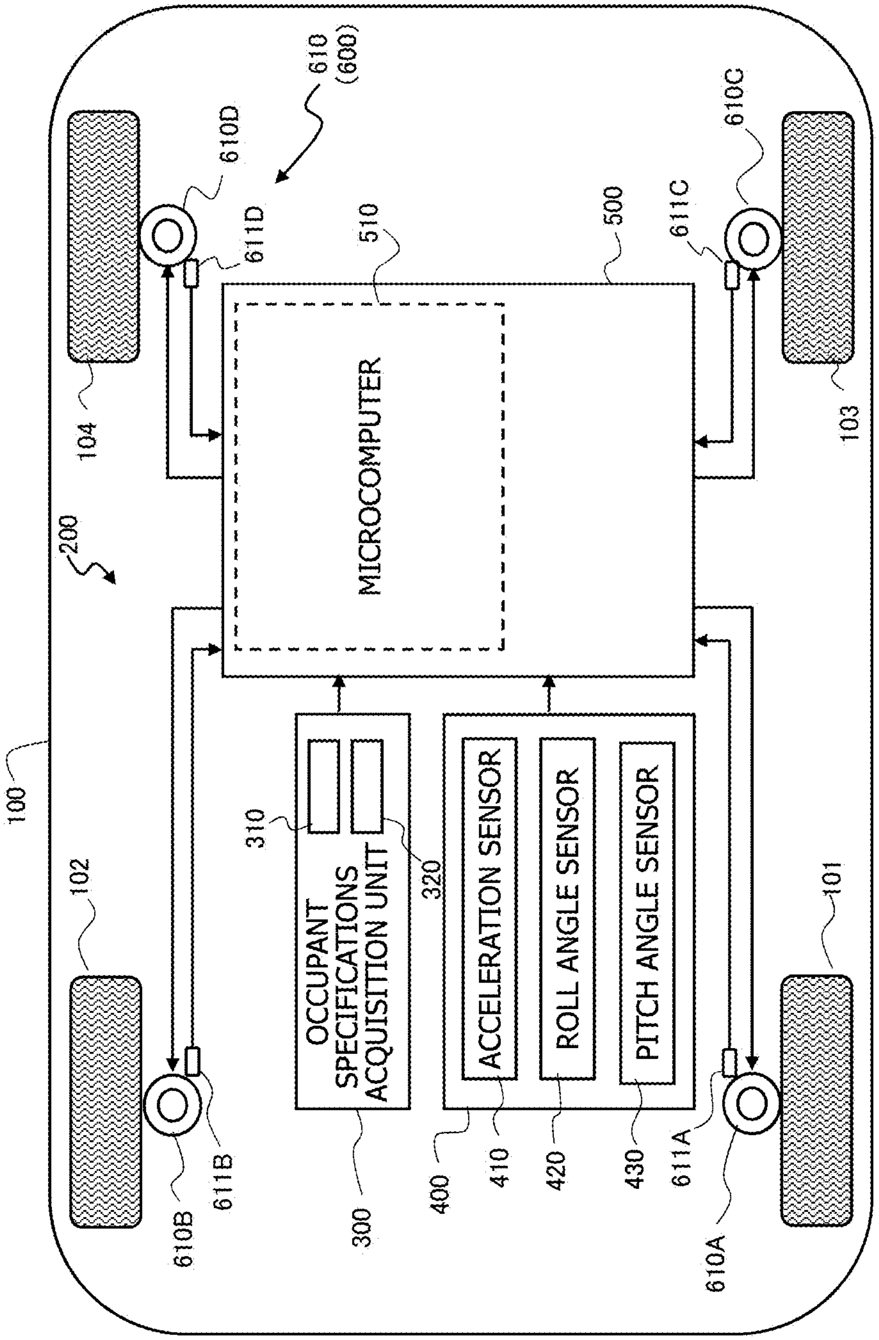
FIG. 1 is a block diagram illustrating a vehicle control system.

FIG. 1 is a block diagram illustrating a mode of a vehicle control system 200 mounted in a vehicle 100.

Vehicle 100 is a four-wheeled vehicle having a pair of right and left front road wheels 102 and 101 and a pair of right and left rear road wheels 104 and 103.

Vehicle control system 200 is a system for realizing a vehicle attitude control function, which is a function of actively controlling the attitude of vehicle 100, in order to improve comfort for an occupant in vehicle 100.

The vehicle attitude control function is a function of controlling the attitude of vehicle 100, based on a physical quantity about an occupant roll moment and/or an occupant pitch moment applied to the occupant by the force that the occupant receives from a behavior of vehicle 100.

That is, the vehicle attitude control function is a function of using, as a control index, a moment applied to the occupant, the moment including at least one of the occupant roll moment and the occupant pitch moment, and controlling the attitude of vehicle 100, specifically, the roll angle or the pitch angle, such that the moment applied to the occupant is reduced.

In order to realize the vehicle attitude control function, vehicle control system 200 includes an occupant specifications acquisition unit 300, a vehicle operation state acquisition unit 400, a vehicle control apparatus 500, and an actuator unit 600.

That is, vehicle control apparatus 500 acquires various kinds of information from occupant specifications acquisition unit 300 and vehicle operation state acquisition unit 400, and outputs a control command for activating actuator unit 600 based on the acquired information, so as to control the attitude of vehicle 100 such that the moment applied to the occupant (specifically, the occupant roll moment and/or the occupant pitch moment) is reduced.

Occupant specifications acquisition unit 300 is an apparatus that acquires occupant specifications including the mass of the occupant in vehicle 100 and the position of the center of gravity of the occupant in vehicle 100.

Specifically, occupant specifications acquisition unit 300 acquires information about the mass of the upper body of the occupant sitting on a seat of vehicle 100 and information about the position of the center of gravity of the upper body of this occupant (in other words, the distance between the center of gravity and the seat surface).

The occupant specifications acquired by occupant specifications acquisition unit 300 may be information that is set in advance or information that is acquired each time an occupant sits on the seat.

Hereinafter, examples of how occupant specifications acquisition unit 300 acquires the occupant specifications will be described.

In one mode, occupant specifications acquisition unit 300 includes sensors for detecting the occupant specifications.

For example, the sensors for detecting the occupant specifications are a body weight sensor 310 that is installed in the seat of vehicle 100 and a camera 320 that captures a frontal image of the occupant sitting on the seat of vehicle 100.

In this example, body weight sensor 310 detects the mass of the upper body of the occupant sitting on the seat of vehicle 100.

Camera 320 captures an image of the upper body of the occupant sitting in vehicle 100, and recognizes, for example, a location corresponding to a predetermined ratio of a distance LS between a shoulder of the occupant and the seat surface, as the position of the center of gravity of the upper body of the occupant (in other words, the point of the center of gravity of the upper body).

Occupant specifications acquisition unit 300 may acquire dimensional data representing the physique of the occupant, such as the sitting height and the chest width of the occupant, from the image captured by camera 320, and may estimate the mass of the upper body of the occupant and the position of the center of gravity of the upper body of the occupant from the acquired dimensional data.

Occupant specifications acquisition unit 300 may be configured without a sensor such as body weight sensor 310 or camera 320. Occupant specifications acquisition unit 300 may estimate the mass of the occupant and the position of the center of gravity of the occupant from information about the seat belt usage state, such as the pulled-out length or the height adjustment position of the seat belt installed at the seat.

Occupant specifications acquisition unit 300 may be configured to estimate the mass of the upper body of the occupant and the position of the center of gravity of the upper body of the occupant from data such as a height and a body weight entered by the occupant.

Occupant specifications acquisition unit 300 may be configured to include a database in which physique data is stored for each known occupant. In this case, occupant specifications acquisition unit 300 determines the occupant sitting on the seat based on an authentication technique such as face authentication, and acquires the physique data of the determined occupant by searching the database.

The physique data is, for example, the height and the body weight or the mass of the upper body and the position of the center of gravity of the upper body.

Occupant specifications acquisition unit 300 may acquire the occupant specifications by reading out standard data of the mass of the occupant and the position of the center of gravity of the occupant, the standard data being stored in advance in a memory.

Alternatively, occupant specifications acquisition unit 300 may acquire information about the occupant specifications including the mass of the occupant and the position of the center of gravity of the occupant, by using a known method.

Vehicle operation state acquisition unit 400 is an apparatus that acquires information about the operation state of vehicle 100, and the information includes physical quantities about attitude angles of vehicle 100 including at least one of the roll angle and the pitch angle of vehicle 100, and physical quantities about accelerations of vehicle 100.

In one mode, vehicle operation state acquisition unit 400 includes an acceleration sensor 410 as an acceleration detection unit that detects physical quantities about accelerations of vehicle 100, and includes a roll angle sensor 420 and a pitch angle sensor 430 as attitude angle detection units that detect physical quantities about attitude angles of vehicle 100.

Acceleration sensor 410 detects a longitudinal acceleration, which is the acceleration of vehicle 100 in the longitudinal direction thereof, a lateral acceleration, which is the acceleration of vehicle 100 in the lateral direction thereof, and a vertical acceleration, which is the acceleration of vehicle 100 in the vertical direction thereof.

Roll angle sensor 420 detects the roll angle of vehicle 100 as an attitude angle of vehicle 100.

Pitch angle sensor 430 detects the pitch angle of vehicle 100 as an attitude angle of vehicle 100.

Vehicle operation state acquisition unit 400 may include a gyroscope sensor (in other words, an angular rate sensor) that detects the roll angle rate and pitch angle rate, instead of roll angle sensor 420 and pitch angle sensor 430.

If vehicle operation state acquisition unit 400 includes a gyroscope sensor, vehicle control system 200 uses a roll angle estimated based on a detected value of the roll angle rate and a pitch angle estimated based on a detected value of the pitch angle rate for the vehicle attitude control.

For example, actuator unit 600 includes an active suspension 610 as an actuator capable of controlling the attitude of vehicle 100.

Active suspension 610 is a suspension apparatus capable of actively controlling the suspension stroke of each of road wheels 101 to 104 separately, and includes hydraulic, electromagnetic, or electrodynamic actuators 610A to 610D for road wheels 101 to 104, respectively.

Active suspension 610 can control the roll attitude and the pitch attitude of vehicle 100 by individually controlling actuators 610A to 610D.

Vehicle control apparatus 500 includes a microcomputer 510 as a control unit that outputs a result obtained by an operation based on the acquired information.

Microcomputer 510 includes a microprocessor unit (MPU), a read-only memory (ROM), a random access memory (RAM), etc., which are not illustrated in FIG. 1.

Microcomputer 510 may also be referred to as a micro controller unit (MCU), a processor, a processing device, or an arithmetic device, for example.

Microcomputer 510 acquires occupant specifications including the mass of the occupant sitting on the seat of vehicle 100 and the position of the center of gravity of the occupant from occupant specifications acquisition unit 300.

Microcomputer 510 also acquires the attitude angle information about vehicle 100 and the acceleration information about vehicle 100 from vehicle operation state acquisition unit 400.

Next, microcomputer 510 executes arithmetic processing based on the occupant specifications, the attitude angle of vehicle 100, and the accelerations of vehicle 100, and outputs a control command for activating actuator unit 600 (specifically, active suspension 610).

The occupant specifications, the attitude angle of vehicle 100, and the accelerations of vehicle 100 are parameters relating to the moment applied to the occupant.

That is, by controlling active suspension 610 based on the occupant specifications, the attitude angle of vehicle 100, and the accelerations of vehicle 100, microcomputer 510 controls the roll angle or the pitch angle of vehicle 100 such that the moment applied to the occupant is reduced.

In other words, microcomputer 510 is a control unit that executes the above-described roll angle control method or pitch angle control method and that is mounted in vehicle 100.

Figure 2:
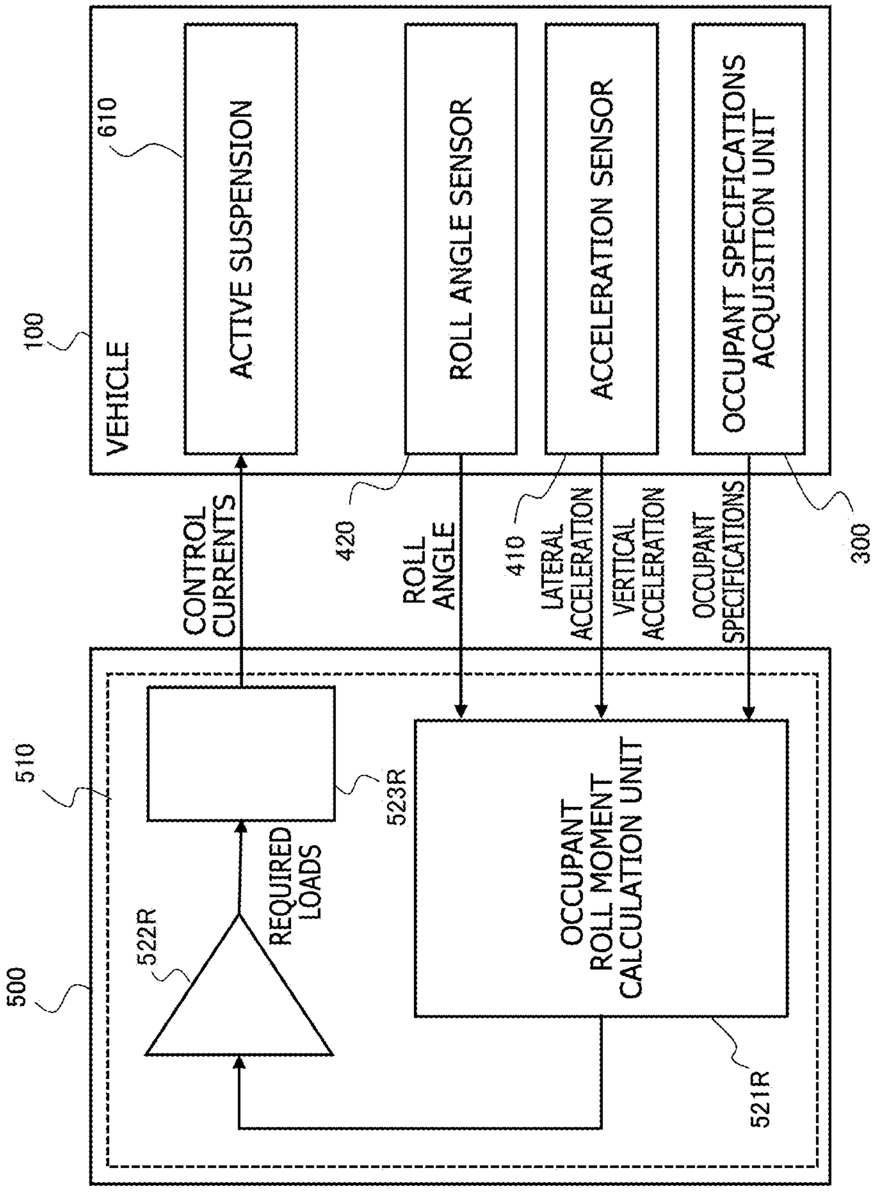
FIG. 2 is a functional block diagram illustrating a first embodiment of roll angle control

FIG. 2 is a functional block diagram illustrating a first embodiment of control (hereinafter referred to as roll angle control) in which microcomputer 510 outputs a control command for activating active suspension 610 based on the occupant roll moment.

Microcomputer 510 includes various functional units, which are an occupant roll moment calculation unit 521R, an adjustment unit 522R, and an operation unit 523R.

Occupant roll moment calculation unit 521R calculates the occupant roll moment based on the occupant specifications, the roll angle of vehicle 100, and the information about the lateral acceleration and the vertical acceleration of vehicle 100.

Next, adjustment unit 522R calculates a required load for each of actuators 610A to 610D of active suspension 610, based on a signal of the occupant roll moment calculated by occupant roll moment calculation unit 521R.

The required loads are the control quantities of actuators 610A to 610D, and the control quantities are used to realize the roll angle that reduces the occupant roll moment.

Operation unit 523R acquires signals of the required loads of actuators 610A to 610D from adjustment unit 522R, refers to, for example, a map in which a relationship between required loads and target current values is defined, and calculates target current values matching the required loads of actuators 610A to 610D.

Next, operation unit 523R outputs control currents matching the calculated target current values to actuators 610A to 610D of active suspension 610.

Hereinafter, the roll control of vehicle 100 in which the occupant roll moment is used as a control index will be described in detail.

Figure 3:
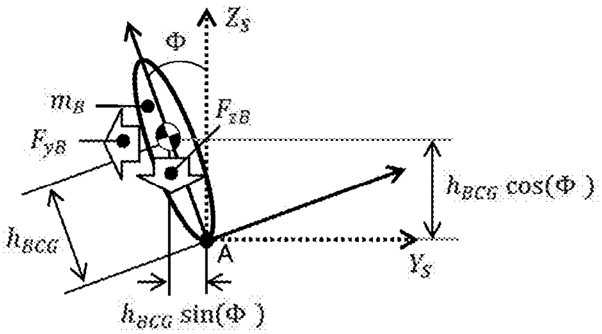
FIG. 3 illustrates a model of an occupant in a vehicle turning.

FIG. 3 illustrates a model of an occupant sitting on a seat of vehicle 100 turning left, the occupant being seen from the front.

In FIG. 3, $m_B$ denotes the mass of the upper body of the occupant sitting on the seat, $h_{BCG}$ denotes the distance between the center of gravity of the upper body of the occupant sitting on the seat and the seat surface of the seat, φ denotes the roll angle of vehicle 100, and Ys denotes the lateral displacement of the seating location.

When vehicle 100 turns, a lateral force FyB and a vertical force FzB are applied to the position of the center of gravity of the occupant, and the occupant receives a rotational moment around a point A of contact with vehicle 100 (in other words, seating point). The occupant perceives this rotational moment as a load.

In the present Application, the rotational moment that the occupant receives when vehicle 100 turns is defined as the occupant roll moment.

Figure 4:
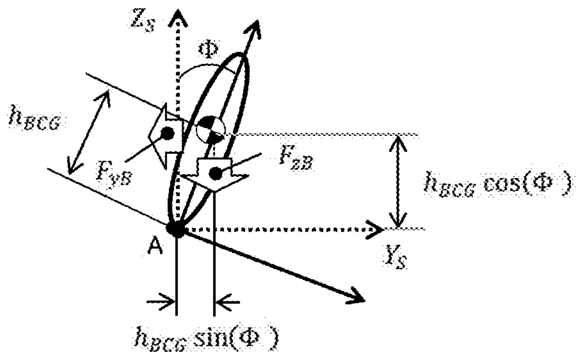
FIG. 4 illustrates a model of an occupant in a vehicle turning when the roll angle control is being executed.

As in FIG. 3, FIG. 4 illustrates a model of an occupant sitting on a seat of vehicle 100 turning left, the occupant being seen from the front. However, in FIG. 4, microcomputer 510 is controlling the roll angle of vehicle 100 such that the occupant roll moment is reduced.

Microcomputer 510 calculates the occupant roll moment, and controls active suspension 610 by using a physical quantity about the calculated occupant roll moment as a control index, such that the roll angle, which is a lateral tilt of vehicle 100, will be opposite to the normal tilt caused by the turning.

With this roll angle control (in other words, the occupant roll moment control) by microcomputer 510, because the moment based on force FzB is applied in the direction opposite to the moment based on force FyB, the occupant roll moment is reduced, and comfort for the occupant is improved.

The roll angle control by microcomputer 510 is not limited to the reverse roll angle control. Microcomputer 510 may execute control such that a roll angle of "reverse roll angle+a predetermined value" is achieved, for example.

Figure 5:
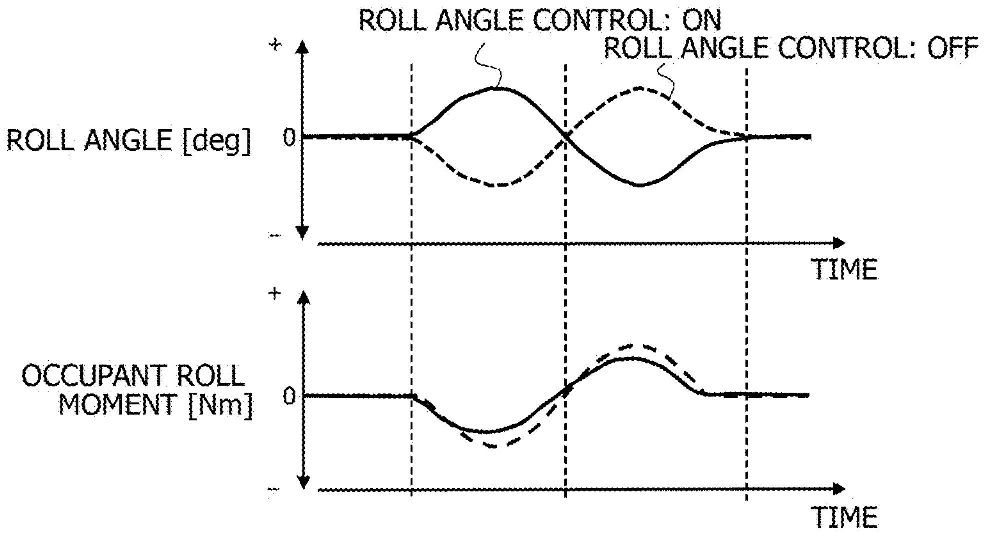
FIG. 5 is a time chart illustrating the difference in roll angle and the difference in occupant roll moment between ON and OFF of the roll angle control.

FIG. 5 is a time chart illustrating the difference in roll angle and the difference in occupant roll moment between ON and OFF of the above-described roll angle control.

The roll angle control generates a roll in the direction opposite to the direction of the normal roll caused by turning, in other words, opposite to the direction of the roll caused when the roll control is OFF.

With this roll angle control, the moment based on force FzB is applied in the opposite direction to the moment based on force FyB, and therefore, the occupant roll moment is reduced.

Next, equations for calculating the occupant roll moment will be described with reference to FIG. 3.

Hereinafter, ay denotes the lateral acceleration at the seating location, Zs denotes the vertical displacement of the seating location, az denotes the vertical acceleration at the seating location, and g denotes the acceleration of gravity.

An equation for the Y-direction translational motion of the occupant is denoted by Equation 1, and lateral force FyB at the position of the center of gravity of the occupant is calculated from Equation 1.

$$F_{yB} = m_B\frac{d^2Y_s}{dt^2} - m_B\frac{d^2}{dt^2}(h_{BCG}\cdot\sin(\phi)) = m_B\left(a_y - h_{BCG}\cdot\frac{d^2}{dt^2}(\sin(\phi))\right) \quad \text{[Equation 1]}$$

In addition, an equation for the Z-direction translational motion of the occupant is denoted by Equation 2, and vertical force FzB at the position of the center of gravity of the occupant is calculated from Equation 2.

$$F_{zB} = m_B\frac{d^2Z_s}{dt^2} + m_B\frac{d^2}{dt^2}(h_{BCG}\cdot\cos(\phi)) + m_B\cdot g = m_B\left(a_z + h_{BCG}\cdot\frac{d^2}{dt^2}(\cos(\phi)) + g\right) \quad \text{[Equation 2]}$$

In addition, an occupant roll moment M applied to the point A of contact between the occupant and vehicle 100 (in other words, the seating point) is calculated from Equation 3.

$$M = F_{yB}h_{BCG}\cdot\cos(\phi) + F_{zB}h_{BCG}\cdot\sin(\phi) \quad \text{[Equation 3]}$$

That is, occupant roll moment calculation unit 521R can calculate occupant roll moment M in accordance with Equations 1 to 3, based on the occupant specifications, the roll angle of vehicle 100, and the information about the lateral acceleration and the vertical acceleration of vehicle 100.

The lateral acceleration that microcomputer 510 (occupant roll moment calculation unit 521R) uses to calculate the occupant roll moment may be the lateral acceleration at the seating location of the occupant or may be the lateral acceleration at the position of the center of gravity of vehicle 100.

Figure 6:
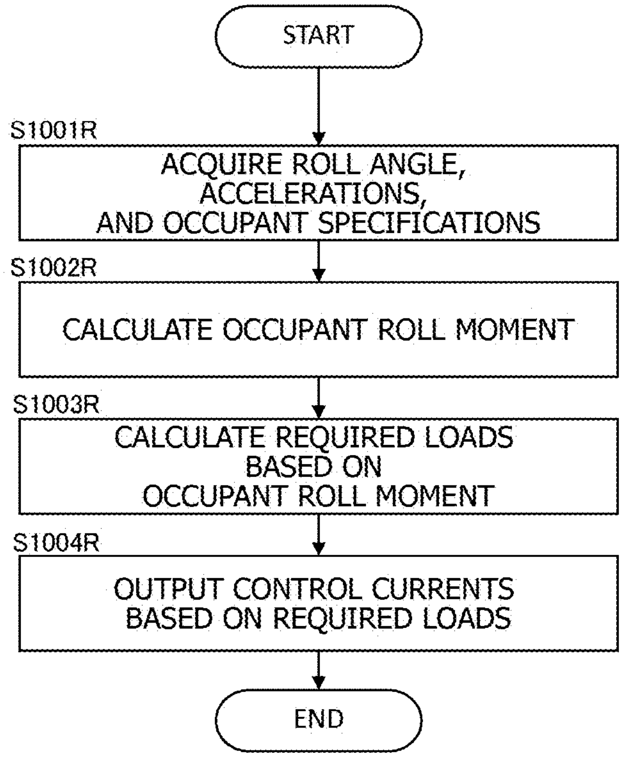
FIG. 6 is a flowchart illustrating a control process according to the first embodiment of the roll angle control.

FIG. 6 is a flowchart illustrating a control process executed by the functional blocks in FIG. 2.

In step S1001R, microcomputer 510 acquires the occupant specifications, the roll angle of vehicle 100, and the information about the lateral acceleration and the vertical acceleration of vehicle 100.

The occupant specifications acquired by microcomputer 510 in step S1001R includes the mass of the occupant and the position of the center of gravity of the occupant.

Next, in step S1002R, microcomputer 510 calculates the occupant roll moment in accordance with Equations 1 to 3 described above.

Steps S1001R and S1002R in the control process are executed by occupant roll moment calculation unit 521R.

After microcomputer 510 calculates the occupant roll moment, the process proceeds to step S1003R, and microcomputer 510 calculates the required loads of actuators 610A to 610D of active suspension 610 based on the occupant roll moment.

Step S1003R in the control process is executed by adjustment unit 522R.

Next, in step S1004R, microcomputer 510 calculates target current values matching the required loads of actuators 610A to 610D, and outputs control currents matching the calculated target current values to actuators 610A to 610D of active suspension 610.

Step S1004R in the control process is executed by operation unit 523R.

In the case of the functional block diagram illustrated in FIG. 2, microcomputer 510 outputs a control command for activating active suspension 610 based on the magnitude of the occupant roll moment.

Alternatively, microcomputer 510 may be configured to output a control command for activating active suspension 610 based on the time rate of change of the occupant roll moment.

If the control is executed based on the time rate of change of the occupant roll moment, occupant roll moment calculation unit 521R first calculates the occupant roll moment from the occupant specifications, the accelerations, and the roll angle, and next calculates the time rate of change of the occupant roll moment (in other words, the time derivative).

Next, adjustment unit 522R calculates the rate of change of the target roll angle based on the time rate of change of the occupant roll moment.

The rate of change of the target roll angle is a target value of the change of the roll angle that prevents increase in occupant roll moment.

Operation unit 523R outputs a control current for realizing the rate of change of the target roll angle to each of actuators 610A to 610D of active suspension 610.

Although the above description has been made about a case in which microcomputer 510 controls active suspension 610 based on the occupant roll moment, microcomputer 510 can also control active suspension 610 based on the occupant pitch moment in a similar way.

Figure 7:
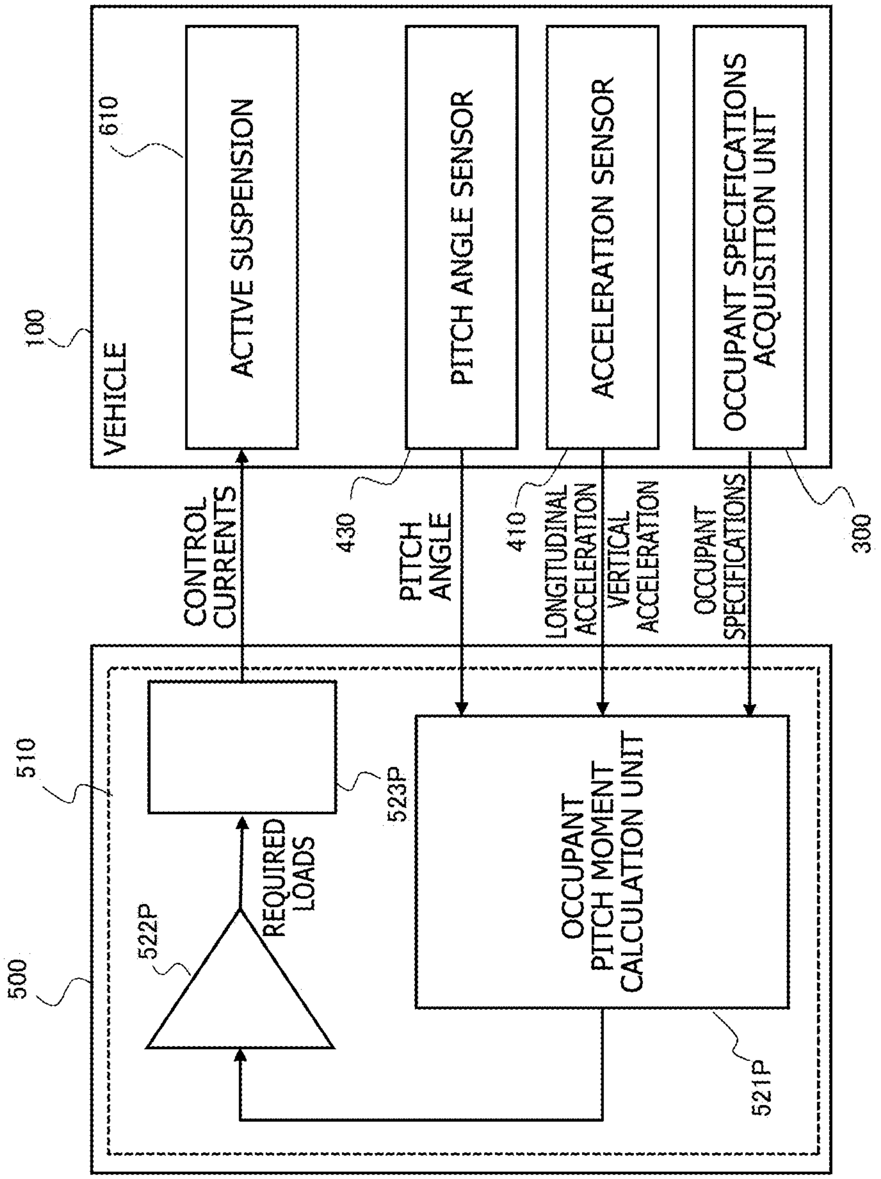
FIG. 7 is a functional block diagram illustrating a first embodiment of pitch angle control.

FIG. 7 is a functional block diagram illustrating the first embodiment of control (hereinafter referred to as pitch angle control) in which microcomputer 510 outputs a control command for activating active suspension 610 based on the occupant pitch moment.

In FIG. 7, microcomputer 510 includes various functional units, which are an occupant pitch moment calculation unit 521P, an adjustment unit 522P, and an operation unit 523P.

Occupant pitch moment calculation unit 521P calculates the occupant pitch moment based on the occupant specifications, the pitch angle of vehicle 100, and the information about the longitudinal acceleration and the vertical acceleration of vehicle 100.

The longitudinal acceleration that microcomputer 510 (occupant pitch moment calculation unit 521P) uses to calculate the occupant pitch moment may be the longitudinal acceleration at the seating location of the occupant or may be the longitudinal acceleration at the position of the center of gravity of vehicle 100.

Next, adjustment unit 522P calculates a required load for each of actuators 610A to 610D of active suspension 610, based on a signal of the occupant pitch moment calculated by occupant pitch moment calculation unit 521P.

The required loads are the control quantities of actuators 610A to 610D, and the control quantities are used to realize the pitch angle that reduces the occupant pitch moment.

Operation unit 523P acquires signals of the required loads of actuators 610A to 610D from adjustment unit 522P, refers to, for example, a map in which a relationship between required loads and target current values is defined, and calculates target current values matching the required loads of actuators 610A to 610D.

Next, operation unit 523P outputs control currents matching the calculated target current values to actuators 610A to 610D of active suspension 610.

When microcomputer 510 controls active suspension 610 based on the occupant pitch moment, microcomputer 510 may control active suspension 610 based on the time rate of change of the occupant pitch moment, instead of the magnitude of the occupant pitch moment.

Figure 8:
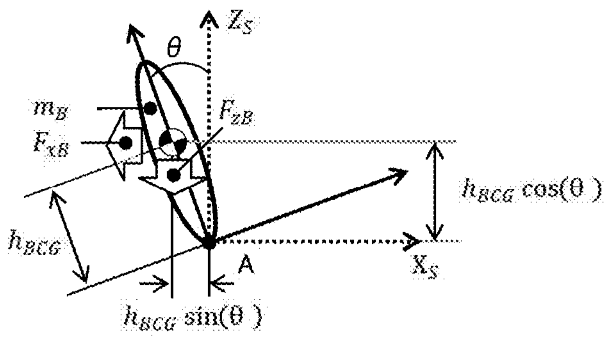
FIG. 8 illustrates a model of an occupant in an accelerating vehicle.

FIG. 8 illustrates a process for calculating the occupant pitch moment, which is the pitch moment applied to an occupant by behavior of vehicle 100. Specifically, FIG. 8 illustrates a model of an occupant sitting on a seat of vehicle 100 accelerating, the occupant being seen from a side.

In this occupant pitch moment calculation process, mB denotes the mass of the upper body of the occupant sitting on the seat, hBCG denotes the distance between the center of gravity of the upper body of the occupant sitting on the seat and the seat surface of the seat, 0 denotes the pitch angle of vehicle 100, Xs denotes the longitudinal displacement of the seating location, ax denotes the longitudinal acceleration at the seating location, Zs denotes the vertical displacement of the seating location, az denotes the vertical acceleration at the seating location, and g denotes the acceleration of gravity.

An equation for the X-direction translational motion of the occupant is denoted by Equation 4, and a longitudinal force FxB at the position of the center of gravity of the occupant is calculated from Equation 4.

$$\begin{aligned} F_{xB} &= m_B\frac{d^2X_s}{dt^2} - m_B\frac{d^2}{dt^2}(h_{BCG}\cdot\sin(\theta)) \\ &= m_B\left(a_x - h_{BCG}\cdot\frac{d^2}{dt^2}(\sin(\theta))\right) \end{aligned} \quad \text{[Equation 4]}$$

In addition, an equation for the Z-direction translational motion of the occupant is denoted by Equation 5, and longitudinal force FzB at the position of the center of gravity of the occupant is calculated from Equation 5.

$$\begin{aligned} F_{zB} &= m_B\frac{d^2Z_s}{dt^2} + m_B\frac{d^2}{dt^2}(h_{BCG}\cdot\cos(\theta)) + m_B\cdot g \\ &= m_B\left(a_z + h_{BCG}\cdot\frac{d^2}{dt^2}(\cos(\theta)) + g\right) \end{aligned} \quad \text{[Equation 5]}$$

In addition, an occupant pitch moment M applied to point A of contact between the occupant and vehicle 100 is calculated from Equation 6.

$$M = F_{xB}h_{BCG}\cdot\cos(\theta) + F_{zB}h_{BCG}\cdot\sin(\theta) \quad \text{[Equation 6]}$$

That is, when vehicle 100 accelerates (or decelerates), longitudinal force FxB and vertical force FzB are applied to the position of the center of gravity of the occupant, and the occupant receives a rotational moment around point A of contact with vehicle 100. The occupant senses this rotational moment as a load.

In the present application, the rotational moment that the occupant receives when vehicle 100 accelerates or decelerates is defined as the occupant pitch moment.

When vehicle 100 accelerates or decelerates, microcomputer 510 controls the pitch angle, which is a longitudinal tilt of vehicle 100, such that the pitch angle will be opposite to the normal tilt caused by the acceleration or deceleration. Because the moment based on force FzB is applied in the direction opposite to the moment based on force FxB, the occupant pitch moment is reduced, and comfort for the occupant is improved.

The pitch angle control by microcomputer 510 is not limited to the reverse pitch angle control. Microcomputer 510 may execute control such that a pitch angle of "reverse pitch angle+a predetermined value" is achieved, for example.

Figure 9:
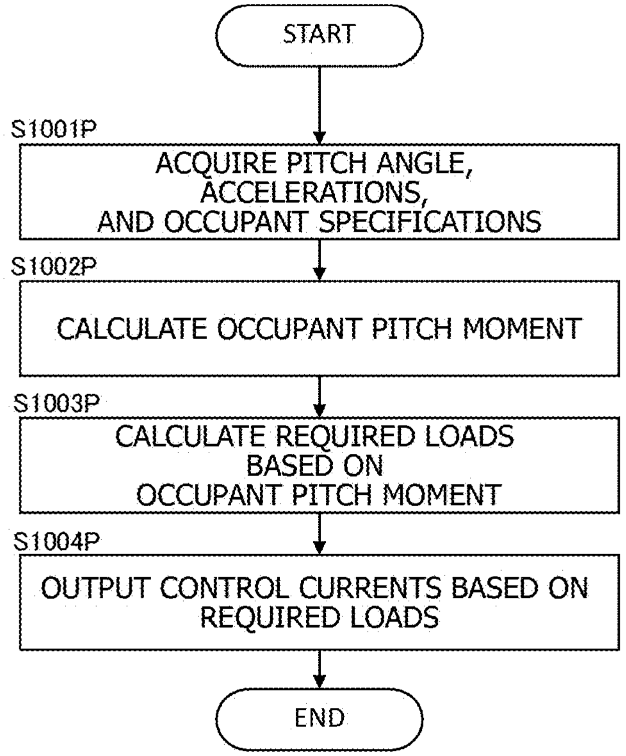
FIG. 9 is a flowchart illustrating a control process according to the first embodiment of the pitch angle control.

FIG. 9 is a flowchart illustrating a control process executed by the functional blocks in FIG. 7.

In step S1001P, microcomputer 510 acquires the occupant specifications such as the mass of the occupant and the position of the center of gravity of the occupant, the pitch angle of vehicle 100, and the information about the longitudinal acceleration and the vertical acceleration of vehicle 100.

Next, in step S1002P, microcomputer 510 calculates the occupant pitch moment in accordance with Equations 4 to 6 described above.

Steps S1001P and S1002P in the control process are executed by occupant pitch moment calculation unit 521P.

After microcomputer 510 calculates the occupant pitch moment, the process proceeds to step S1003P, and microcomputer 510 calculates the required loads of actuators 610A to 610D of active suspension 610 based on the occupant pitch moment.

Step S1003P in the control process is executed by adjustment unit 522P.

Next, in step S1004P, microcomputer 510 calculates target current values matching the required loads of actuators 610A to 610D, and outputs control currents matching the calculated target current values to actuators 610A to 610D of active suspension 610.

Step S1004P in the control process is executed by operation unit 523P.

Figure 10:
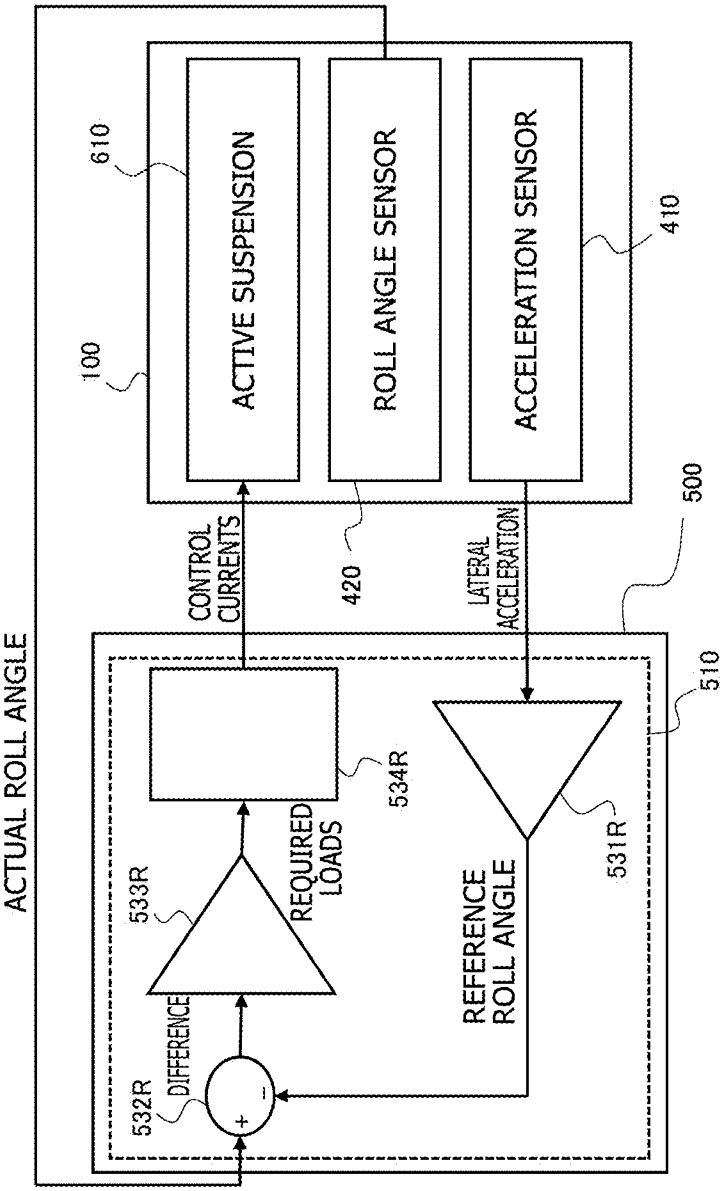
FIG. 10 is a functional block diagram illustrating a second embodiment of roll angle control.

FIG. 10 is a functional block diagram illustrating a second embodiment of roll angle control executed by microcomputer 510.

In FIG. 10, microcomputer 510 includes various functional units, which are a setting unit 531R, a comparison unit 532R, an adjustment unit 533R, and an operation unit 534R.

Microcomputer 510 sets a reference roll angle based on the occupant roll moment, and controls actuators 610A to 610D of active suspension 610 such that the actual roll angle matches the reference roll angle.

Setting unit 531R is a functional unit that sets a reference roll angle (in other words, a target roll angle) based on the lateral acceleration of vehicle 100. For example, setting unit 531R calculates a reference roll angle by multiplying a signal of the lateral acceleration of vehicle 100 acquired from acceleration sensor 410 by a gain.

The reference roll angle that setting unit 531R calculates based on the lateral acceleration of vehicle 100 is a roll angle in the direction opposite to the normal roll caused by a turn (that is, a roll that raises the turning inner road wheels), and is a roll angle based on the occupant roll moment, as will be described below.

Comparison unit 532R acquires a signal of the reference roll angle from setting unit 531R, and acquires a signal of the actual roll angle of vehicle 100 from roll angle sensor 420. Next, comparison unit 532R calculates a roll angle difference (in other words, control operation signal) by subtracting the reference roll angle from the actual roll angle.

Adjustment unit 533R acquires a signal of the roll angle difference from comparison unit 532R, and executes, for example, a proportional action, an integral action, and a derivative action (which will be referred to as PID actions) based on the roll angle difference, so as to calculate the required loads of actuators 610A to 610D of active suspension 610.

That is, adjustment unit 533R individually sets target loads (in other words, target propulsion force) of actuators 610A to 610D of road wheels 101 to 104 such that the actual roll angle reaches the reference roll angle as the target value.

Operation unit 534R acquires signals of the required loads of actuators 610A to 610D from adjustment unit 533R, refers to, for example, a map in which a relationship between required loads and target current values is defined, and calculates target current values matching the required loads of actuators 610A to 610D.

Next, operation unit 534R outputs control currents matching the calculated target current values to actuators 610A to 610D of active suspension 610.

Next, a process for setting the reference roll angle based on the lateral acceleration of vehicle 100 will be described.

From Equation 3 described above, an ideal state of the occupant roll moment, that is, a state in which the occupant roll moment is minimized and the occupant is most comfortable, is achieved when Equation 7 is satisfied.

$$F_{yB}h_{BCG}\cdot\cos(\phi)+F_{zB}h_{BCG}\cdot\sin(\phi)=0 \quad \text{[Equation 7]}$$

A roll angle q when Equation 7 is satisfied is calculated from Equation 8.

$$\phi=\tan^{-1}\left(-\frac{F_{yB}}{F_{zB}}\right)\approx-\frac{F_{yB}}{F_{zB}} \quad \text{[Equation 8]}$$

Equation 9 is satisfied from Equations 1 and 2 described above.

$$F_{yB}\approx m_B a_y \quad \text{[Equation 9]}$$

$$F_{zB}\approx m_B g$$

Equation 10 is derived from Equations 8 and 9.

$$\frac{F_{yB}}{F_{zB}}\approx-\frac{a_y}{g}\approx\text{Gain}\times a_y \quad \text{[Equation 10]}$$

That is, the reference roll angle that achieves the ideal state of the occupant roll moment (in other words, the reference roll angle that minimizes the occupant roll moment) can be calculated by multiplying the lateral acceleration at the seating location of the occupant by a gain, which is a negative constant.

The lateral acceleration that microcomputer 510 uses to calculate the reference roll angle may be the lateral acceleration at the seating location of the occupant or may be the lateral acceleration at the position of the center of gravity of vehicle 100.

Figure 11:
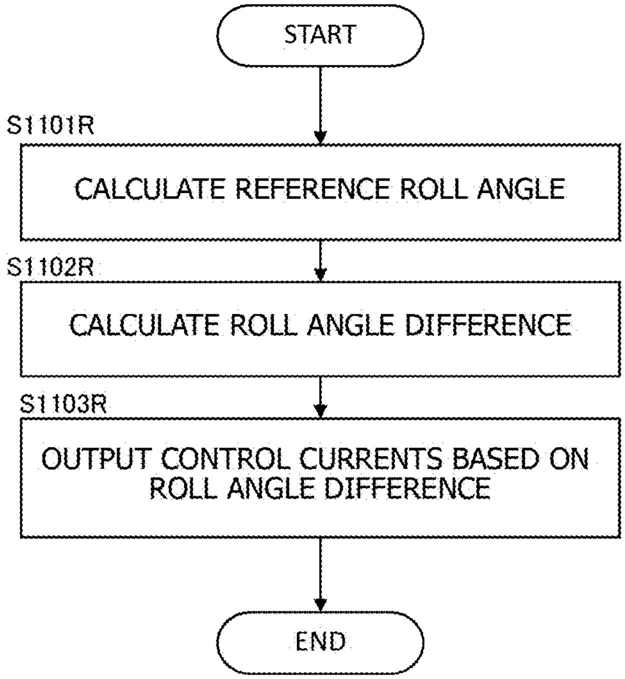
FIG. 11 is a flowchart illustrating a control process according to the second embodiment of the roll angle control.

FIG. 11 is a flowchart illustrating a control process executed by the functional blocks in FIG. 10.

In step S1101R, microcomputer 510 calculates a reference roll angle for reducing the occupant roll moment, based on the lateral acceleration.

Next, in step S1102R, microcomputer 510 calculates the difference between the actual roll angle and the reference roll angle.

Next, in step S1103R, microcomputer 510 outputs control currents of actuators 610A to 610D of active suspension 610 based on the difference between the actual roll angle and the reference roll angle.

Figure 12:
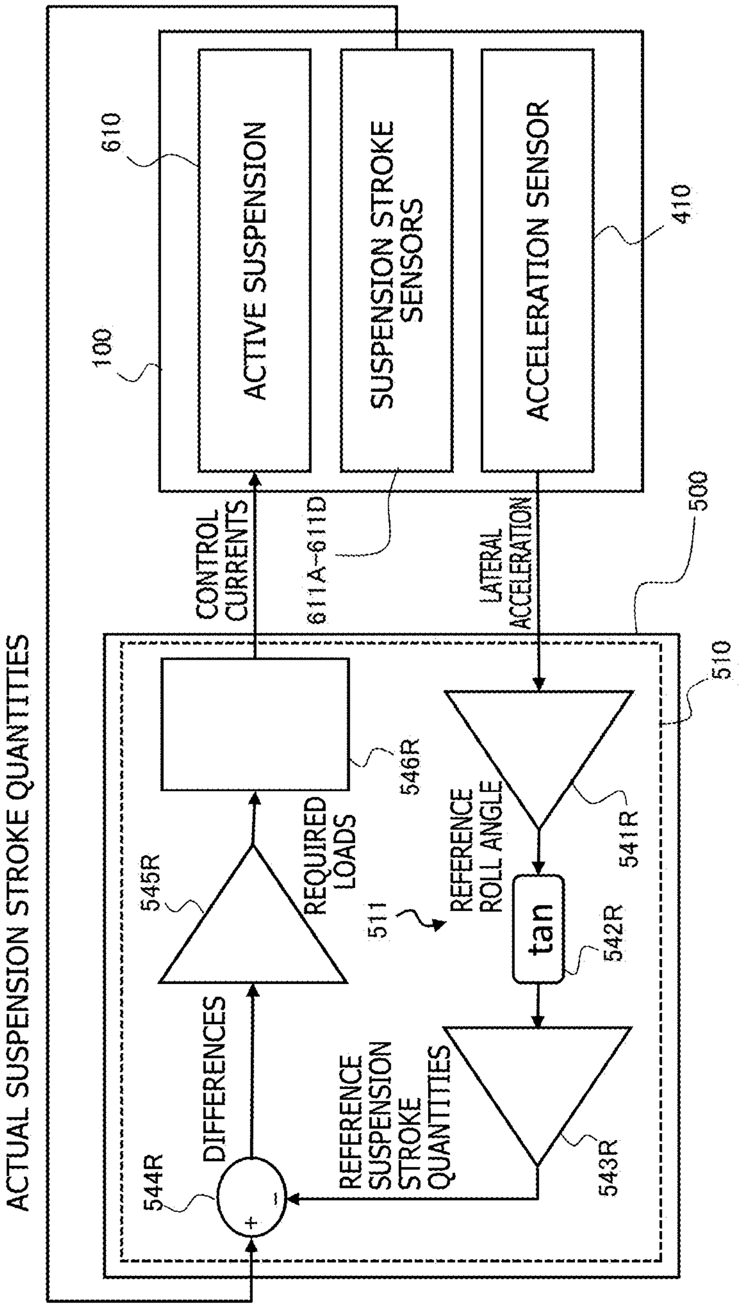
FIG. 12 is a functional block diagram illustrating a third embodiment of roll angle control.

FIG. 12 is a functional block diagram illustrating a third embodiment of roll angle control executed by microcomputer 510.

In FIG. 12, microcomputer 510 includes various functional units, which are a reference roll angle setting unit 541R, a tangent operation unit 542R, a reference suspension stroke quantity setting unit 543R, a comparison unit 544R, an adjustment unit 545R, and an operation unit 546R.

Microcomputer 510 converts a reference roll angle into reference suspension stroke quantities, and outputs control currents based on suspension stroke differences, each of which is a difference between a reference suspension stroke quantity and an actual suspension stroke quantity, to actuators 610A to 610D of active suspension 610.

Reference roll angle setting unit 541R is a functional unit that sets a reference roll angle based on the lateral acceleration of vehicle 100. For example, reference roll angle setting unit 541R calculates a reference roll angle by multiplying a signal of the lateral acceleration of vehicle 100 acquired from acceleration sensor 410 by a gain.

Tangent operation unit 542R acquires a signal of the reference roll angle from reference roll angle setting unit 541R and executes a tangent operation based on the reference roll angle.

Reference suspension stroke quantity setting unit 543R calculates a reference suspension stroke quantity (in other words, a target suspension stroke quantity) for each of road wheels 101 to 104 for realizing the reference roll angle, by multiplying the value, which has been obtained by the tangent operation executed on the reference roll angle and which has been acquired from tangent operation unit 542R, by half the tread width of vehicle 100.

Active suspension 610 includes suspension stroke sensors 611A-611D that detect suspension stroke quantities of road wheels 101 to 104 (see FIG. 1).

Next, comparison unit 544R acquires signals of the reference suspension stroke quantities from reference suspension stroke quantity setting unit 543R, and acquires signals of the actual suspension stroke quantities from suspension stroke sensors 611A to 611D.

Comparison unit 544R subtracts the reference suspension stroke quantities from the actual suspension stroke quantities, to calculate a suspension stroke quantity difference for each of road wheels 101 to 104.

Adjustment unit 545R acquires signals of the suspension stroke quantity differences from comparison unit 544R, and calculates the required loads of actuators 610A to 610D of active suspension 610 by executing PID actions, etc., such that the suspension stroke quantity differences are reduced.

Operation unit 546R acquires signals of the required loads of actuators 610A to 610D from adjustment unit 545R, and calculates target current values matching the required loads of actuators 610A to 610D.

Next, operation unit 546R outputs control currents matching the calculated target current values to actuators 610A to 610D of active suspension 610.

Figure 13:
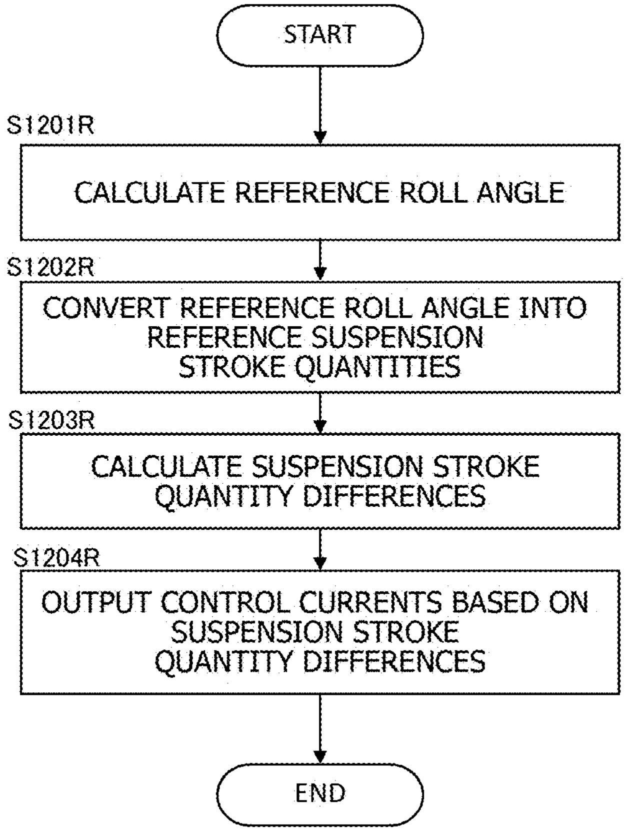
FIG. 13 is a flowchart illustrating a control process according to the third embodiment of the roll angle control.

FIG. 13 is a flowchart illustrating a control process executed by the functional blocks in FIG. 12.

In step S1201R, microcomputer 510 calculates a reference roll angle for reducing the occupant roll moment based on the lateral acceleration of vehicle 100.

Next, in step S1202R, microcomputer 510 converts the reference roll angle into reference suspension stroke quantities of road wheels 101 to 104.

Next, in step S1203R, microcomputer 510 calculates the difference between the actual suspension stroke quantities and the reference suspension stroke quantities.

Next, in step S1204R, microcomputer 510 outputs control currents of actuators 610A to 610D of active suspension 610 based on the difference between the actual suspension stroke quantity and the reference suspension stroke quantity for each of road wheels 101 to 104.

Microcomputer 510 can execute the pitch angle control based on a reference pitch angle in a way similar to the way that microcomputer 510 executes the roll angle control based on the reference roll angle illustrated in FIGS. 10 to 13.

Figure 14:
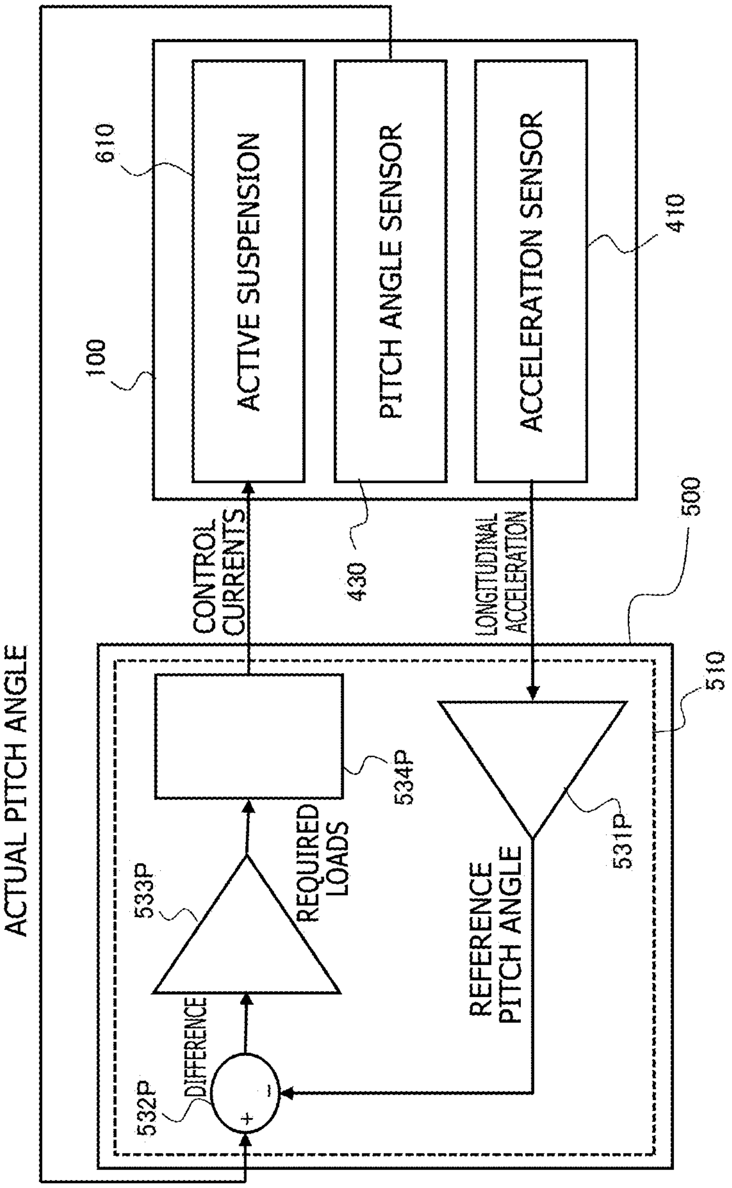
FIG. 14 is a functional block diagram illustrating a second embodiment of pitch angle control.

FIG. 14 is a functional block diagram illustrating the second embodiment of pitch angle control executed by microcomputer 510.

In FIG. 14, microcomputer 510 includes various functional units, which are a setting unit 531P, a comparison unit 532P, an adjustment unit 533P, and an operation unit 534P.

Setting unit 531P is a functional unit that sets a reference pitch angle (in other words, a target pitch angle) based on the longitudinal acceleration of vehicle 100. For example, setting unit 531P calculates a reference pitch angle by multiplying a signal of the longitudinal acceleration of vehicle 100 acquired from acceleration sensor 410 by a gain.

The reference pitch angle that setting unit 531P calculates based on the longitudinal acceleration of vehicle 100 is a pitch angle in the direction opposite to the normal pitch caused by an acceleration or deceleration of vehicle 100, and is a pitch angle based on the occupant pitch moment, as will be described below.

Comparison unit 532P acquires a signal of the reference pitch angle from setting unit 531P, and acquires a signal of the actual pitch angle of vehicle 100 from pitch angle sensor 430. Next, comparison unit 532P calculates a pitch angle difference by subtracting the reference pitch angle from the actual pitch angle.

Adjustment unit 533P acquires a signal of the pitch angle difference from comparison unit 532P, and executes, for example, PID actions based on the pitch angle difference, so as to calculate the required loads of actuators 610A to 610D of active suspension 610.

Operation unit 534P acquires signals of the required loads of actuators 610A to 610D from adjustment unit 533P, calculates target current values matching the required loads of actuators 610A to 610D, and outputs control currents matching the calculated target current values to actuators 610A to 610D of active suspension 610.

Next, a process for setting the reference pitch angle based on the longitudinal acceleration of vehicle 100 will be described.

From Equation 6 described above, an ideal state of the occupant pitch moment, that is, a state in which the occupant pitch moment is minimized and the occupant is most comfortable, is achieved when Equation 11 is satisfied.

$$F_{xB}h_{BCG}\cdot\cos(\theta)+F_{zB}h_{BCG}\cdot\sin(\theta)=0 \quad \text{[Equation 11]}$$

A pitch angle φ when Equation 11 is satisfied is calculated from Equation 12.

$$\theta=\tan^{-1}\left(-\frac{F_{xB}}{F_{zB}}\right)\approx-\frac{F_{xB}}{F_{zB}} \quad \text{[Equation 12]}$$

Equation 13 is obtained from Equations 4 and 5 described above.

$$F_{xB}\approx m_Ba_x \quad \text{[Equation 13]}$$

$$F_{zB}\approx m_Bg$$

Equation 14 is derived from Equations 12 and 13.

$$\frac{F_{xB}}{F_{zB}}\approx-\frac{a_x}{g}\approx \text{Gain}\times a_x \quad \text{[Equation 14]}$$

That is, the reference pitch angle that achieves the ideal state of the occupant pitch moment (in other words, the reference pitch angle that minimizes the occupant pitch moment) can be calculated by multiplying the longitudinal acceleration at the seating location of the occupant by a gain, which is a negative constant. The reference pitch angle is a value based on the occupant pitch moment.

The longitudinal acceleration that microcomputer 510 uses to calculate the reference pitch angle may be the longitudinal acceleration at the seating location of the occupant or may be the longitudinal acceleration at the position of the center of gravity of vehicle 100.

Figure 15:
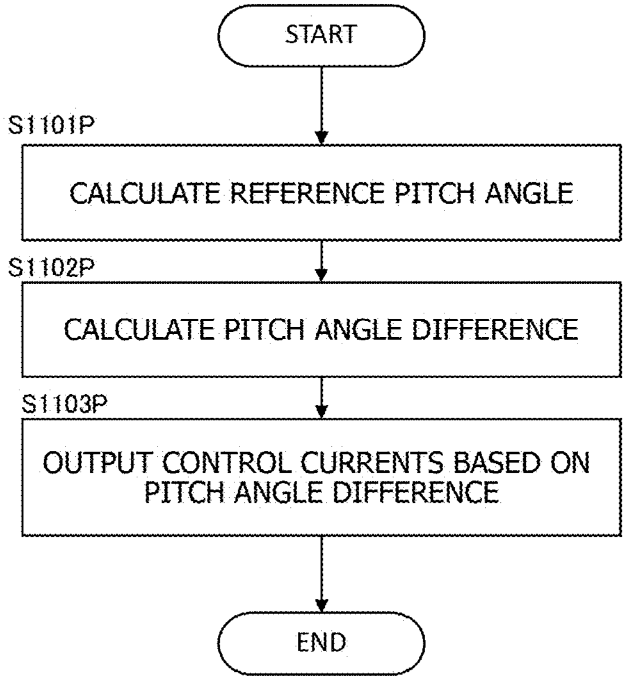
FIG. 15 is a flowchart illustrating a control process according to the second embodiment of the pitch angle control.

FIG. 15 is a flowchart illustrating a control process executed by the functional blocks of microcomputer 510 in FIG. 14.

In step S1101P, microcomputer 510 calculates a reference pitch angle for reducing the occupant pitch moment, based on the longitudinal acceleration.

Next, in step S1102P, microcomputer 510 calculates the difference between the actual pitch angle and the reference pitch angle.

Next, in step S1103P, microcomputer 510 outputs control currents of actuators 610A to 610D of active suspension 610 based on the difference between the actual pitch angle and the reference pitch angle.

Figure 16:
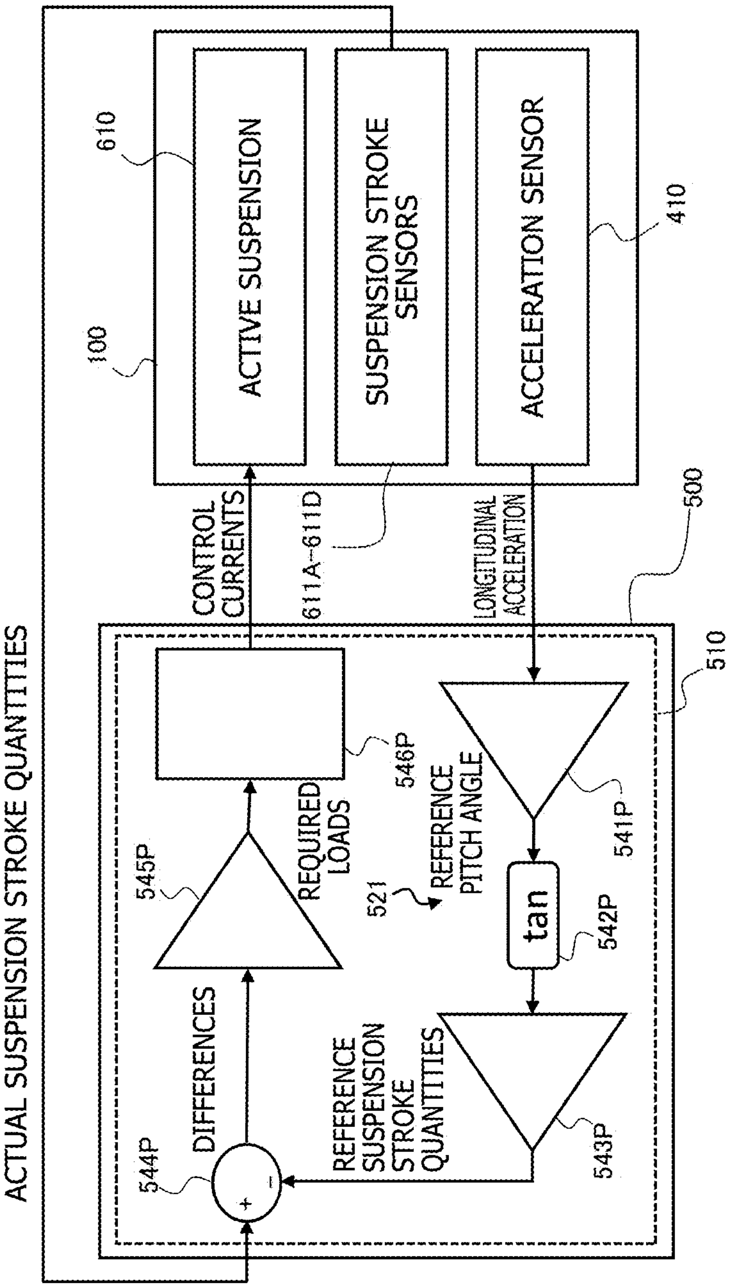
FIG. 16 is a functional block diagram illustrating a third embodiment of pitch angle control.

FIG. 16 is a functional block diagram illustrating the third embodiment of pitch angle control executed by microcomputer 510.

In FIG. 16, microcomputer 510 includes various functional units, which are a reference pitch angle setting unit 541P, a tangent operation unit 542P, a reference suspension stroke quantity setting unit 543P, a comparison unit 544P, an adjustment unit 545P, and an operation unit 546P.

Microcomputer 510 converts a reference pitch angle into reference suspension stroke quantities for road wheels 101-104, and outputs control currents based on the differences, each of which is a difference between a reference suspension stroke quantity and an actual suspension stroke quantity, to actuators 610A to 610D of active suspension 610.

Reference pitch angle setting unit 541P is a functional unit that sets a reference pitch angle based on the longitudinal acceleration of vehicle 100. For example, reference roll angle setting unit 541P calculates a reference pitch angle by multiplying a signal of the longitudinal acceleration of vehicle 100 acquired from acceleration sensor 410 by a gain.

Tangent operation unit 542P acquires a signal of the reference pitch angle from reference pitch angle setting unit 541P and executes a tangent operation based on the reference pitch angle.

Reference suspension stroke quantity setting unit 543P calculates a reference suspension stroke quantity (in other words, a target suspension stroke quantity) for each of road wheels 101 to 104 for realizing the reference pitch angle. For the front road wheels, reference suspension stroke quantity setting unit 543P multiplies the value, which has been obtained by the tangent operation executed on the reference pitch angle and which has been acquired from tangent operation unit 542P, by the distance between the axle of the front road wheels and the position of the center of gravity of the vehicle. For the rear road wheels, reference suspension stroke quantity setting unit 543P multiplies the value, which has been obtained by the tangent operation executed on the reference pitch angle and which has been acquired from tangent operation unit 542P, by the distance between the axle of the rear road wheels and the position of the center of gravity of the vehicle.

Next, comparison unit 544P acquires signals of the reference suspension stroke quantities from reference suspension stroke quantity setting unit 543P, and acquires signals of the actual suspension stroke quantities from suspension stroke sensors 611A to 611D.

Comparison unit 544P subtracts the reference suspension stroke quantities from the actual suspension stroke quantities, to calculate a suspension stroke quantity difference for each of road wheels 101 to 104.

Adjustment unit 545P acquires signals of the suspension stroke quantity differences from comparison unit 544P, and calculates the required loads of actuators 610A to 610D of active suspension 610 by executing PID actions, etc., such that the suspension stroke quantity differences are reduced.

Operation unit 546P acquires signals of the required loads of actuators 610A to 610D from adjustment unit 545P, and calculates target current values matching the required loads of actuators 610A to 610D.

Next, operation unit 546P outputs control currents matching the calculated target current values to actuators 610A to 610D of active suspension 610.

Figure 17:
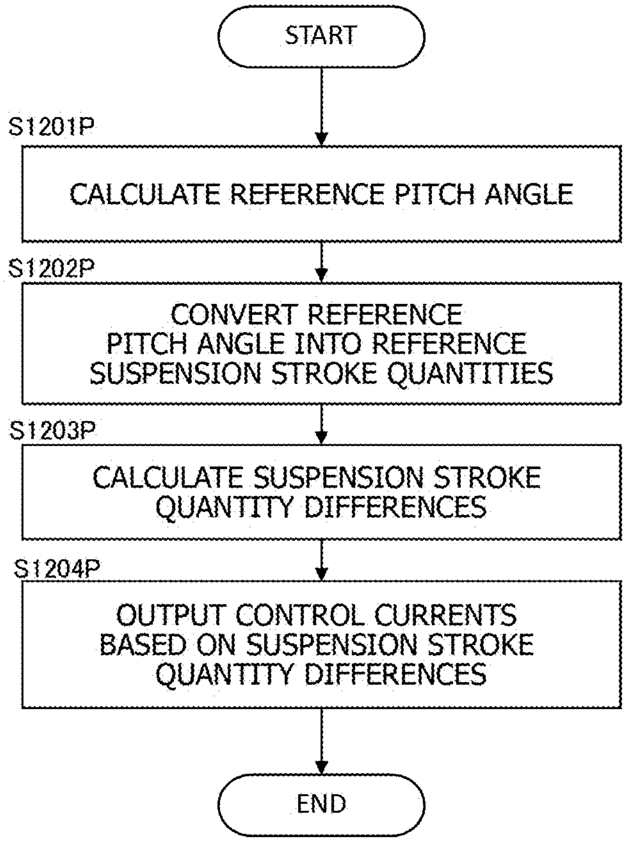
FIG. 17 is a flowchart illustrating a control process according to the third embodiment of the pitch angle control.

FIG. 17 is a flowchart illustrating a control process executed by the functional blocks in FIG. 16.

In step S1201P, microcomputer 510 calculates a reference pitch angle for reducing the occupant pitch moment based on the longitudinal acceleration of vehicle 100.

Next, in step S1202P, microcomputer 510 converts the reference pitch angle into reference suspension stroke quantities of road wheels 101 to 104.

Next, in step S1203P, microcomputer 510 calculates the difference between the actual suspension stroke quantity and the reference suspension stroke quantity for each of road wheels 101 to 104.

Next, in step S1204P, microcomputer 510 outputs control currents of actuators 610A to 610D of active suspension 610 based on the difference between the actual suspension stroke quantity and the reference suspension stroke quantity for each of road wheels 101 to 104.

The individual technical concepts described in the above-described embodiments can be appropriately combined and used, as long as there is no conflict.

In addition, although the present invention has thus been described in detail with reference to preferred embodiments, it will be apparent to those skilled in the art that various types of modifications are possible based on the basic technical concepts and teachings of the present invention.

In the above embodiments, microcomputer 510 controls the roll angle or the pitch angle of vehicle 100 (specifically, the body of vehicle 100) based on the occupant roll moment or the occupant pitch moment. However, the control of the attitude of vehicle 100 is not limited to the control of the attitude of the vehicle body.

For example, if a vehicle includes an actuator for separately changing the attitude of a seat on which an occupant sits with respect to the vehicle body, microcomputer 510 may control the attitude of the seat such that the occupant roll moment or the occupant pitch moment is reduced.

That is, the vehicle attitude in the present application is directed not only to the attitude of the vehicle body, but also to the attitude of the seat.

In addition, the actuator unit for controlling the attitude of vehicle 100 is not limited to active suspension 610.

For example, vehicle control apparatus 500 (microcomputer 510) may control the attitude of vehicle 100 by controlling actuators that apply driving and braking force to road wheels 101 to 104.

In addition, when multiple occupants are present in vehicle 100, vehicle control apparatus 500 (microcomputer 510) may calculate a moment applied to each occupant (specifically, occupant roll moment and/or occupant pitch moment), and control the vehicle attitude by using, for example, an average value or a maximum value of the calculated moments applied to the plurality of occupants as a control index.

In addition, when vehicle control apparatus 500 (microcomputer 510) calculates a moment applied to an occupant (specifically, occupant roll moment and/or occupant pitch moment) based on the acceleration at the position of the center of gravity of vehicle 100, vehicle control apparatus 500 may correct the calculated moment applied to the occupant based on the difference between the position of the center of gravity of vehicle 100 and the location of a seat.

REFERENCE SYMBOL LIST

- 100 Vehicle
- 200 Vehicle control system
- 300 Occupant specifications acquisition unit
- 400 Vehicle operation state acquisition unit
- 500 Vehicle control apparatus
- 510 Microcomputer (control unit)
- 600 Actuator unit
- 610 Active suspension

The invention claimed is:

1. A vehicle control apparatus including a control unit that outputs a result obtained by an operation based on input information, wherein the control unit is configured to acquire occupant specifications including a mass of an occupant in a vehicle and position of center of gravity of the occupant acquire a physical quantity about a roll angle of the vehicle, acquire a physical quantity about an acceleration of the vehicle, and output a control command for activating an actuator unit that controls the roll angle of the vehicle based on a physical quantity about an occupant roll moment, with the occupant roll moment being calculated based on the occupant specifications, the physical quantity about the roll angle, and the physical quantity about the acceleration, and the occupant roll moment being applied to the occupant by a force that the occupant receives from a behavior of the vehicle, wherein the actuator unit is an active suspension, and wherein the control unit acquires a physical quantity about a suspension stroke of the active suspension, calculates a suspension stroke difference, which is a difference between the acquired suspension stroke and a reference suspension stroke obtained by conversion of a reference roll angle of the vehicle, the reference roll angle being calculated based on the occupant roll moment and being a roll angle in a direction opposite to the roll angle of the vehicle, and outputs a control command for activating the active suspension such that the suspension stroke difference is reduced.

2. A vehicle control apparatus including a control unit that outputs a result obtained by an operation based on input information, wherein the control unit is configured to acquire occupant specifications including a mass of an occupant in a vehicle and position of center of gravity of the occupant, acquire a physical quantity about a pitch angle of the vehicle, acquire a physical quantity about an acceleration of the vehicle, and output a control command for activating an actuator unit that controls the pitch angle of the vehicle based on a physical quantity about an occupant pitch moment, with the occupant pitch moment being calculated based on the occupant specifications, the physical quantity about the pitch angle, and the physical quantity about the acceleration, and the occupant pitch moment being applied to the occupant by a force that the occupant receives from a behavior of the vehicle, wherein the actuator unit is an active suspension, and wherein the control unit acquires a physical quantity about a suspension stroke of the active suspension, calculates a suspension stroke difference, which is a difference between the acquired suspension stroke and a reference suspension stroke obtained by conversion of a reference pitch angle of the vehicle, the reference pitch angle being calculated based on the occupant pitch moment and being a pitch angle in a direction opposite to the pitch angle of the vehicle, and outputs a control command for activating the active suspension such that the suspension stroke difference is reduced.

3. A vehicle control apparatus including a control unit that outputs a result obtained by an operation based on input information, wherein the control unit is configured to acquire occupant specifications including a mass of an occupant in a vehicle and position of center of gravity of the occupant, acquire a physical quantity about an attitude angle of the vehicle, the attitude angle including at least one of a roll angle and a pitch angle of the vehicle, acquire a physical quantity about an acceleration of the vehicle, and output a control command for activating an actuator unit that controls an attitude of the vehicle based on a physical quantity about a moment applied to the occupant, with the moment being calculated based on the occupant specifications, the physical quantity about the attitude angle, and the physical quantity about the acceleration, and the moment including at least one of a time rate of change of an occupant roll moment and a time rate of change of an occupant pitch moment, each of the occupant roll moment and the occupant pitch moment being applied to the occupant by a force that the occupant receives from a behavior of the vehicle.

* * * * *